W. E. MOODY.
PACKING.
APPLICATION FILED JULY 24, 1919.

1,353,840.

Patented Sept. 28, 1920.
2 SHEETS—SHEET 1.

Inventor
William E. Moody,
By C. C. Shepherd
Attorney

W. E. MOODY.
PACKING.
APPLICATION FILED JULY 24, 1919.

1,353,840.

Patented Sept. 28, 1920.
2 SHEETS—SHEET 2.

Inventor
William E. Moody.
By C. C. Shepherd
Attorney

UNITED STATES PATENT OFFICE.

WILLIAM E. MOODY, OF COLUMBUS, OHIO, ASSIGNOR TO JAMES ELLWOOD JONES, OF SWITCHBACK, WEST VIRGINIA.

PACKING.

1,353,840.  Specification of Letters Patent.  Patented Sept. 28, 1920.

Application filed July 24, 1919. Serial No. 313,074.

*To all whom it may concern:*

Be it known that I, WILLIAM E. MOODY, a citizen of the United States, residing at Columbus, in the county of Franklin and State of Ohio, have invented certain new and useful Improvements in Packings, of which the following is a specification.

This invention relates broadly to packings, and has for its general object to provide a packing structure adapted to be associated with movable parts for the purpose of preventing the escape of a lubricant from a closure or case containing the same.

More particularly, the present invention has particular reference to the transmission structure disclosed in applicant's co-pending application bearing Serial Number 302,514 filing date June 9, 1919. However, while the present invention is primarily adapted to be employed in connection with the machine disclosed in said application it will be apparent that the same is not limited in its utility to the machine in question, but on the contrary is capable of many widely different uses. However, since its application in arresting the flow of oil from the transmission casing in such machine admirably sets forth its use the following description will be accordingly confined thereto.

Figure 1:
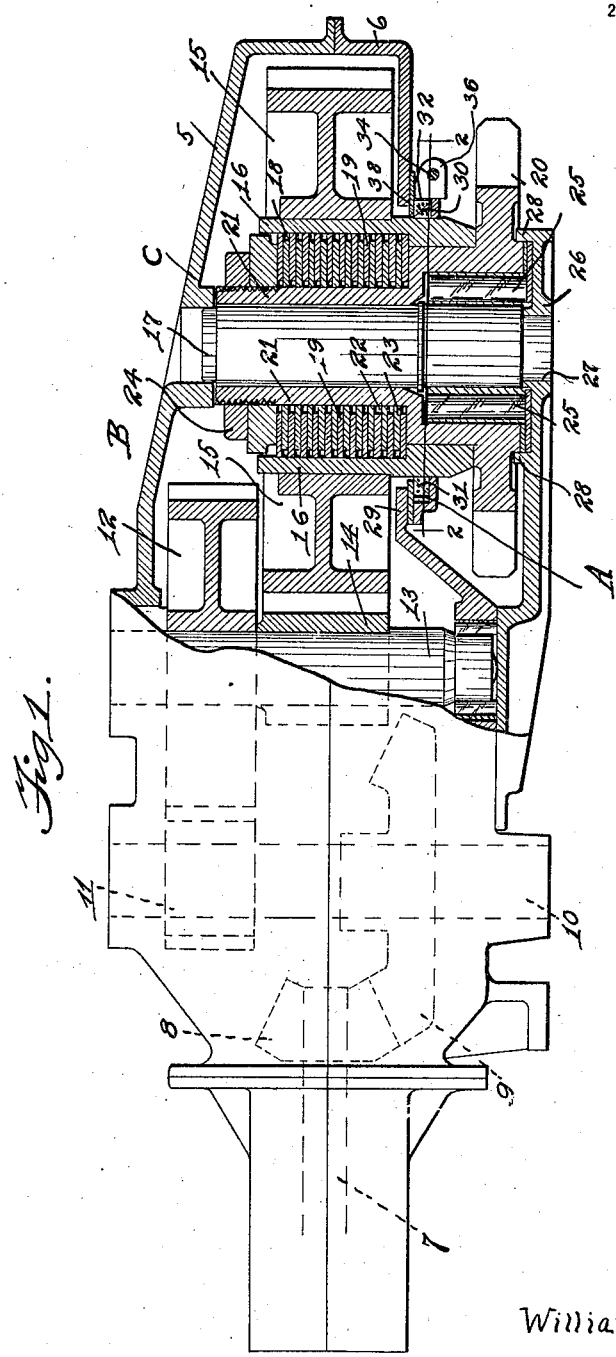
Figure 2:
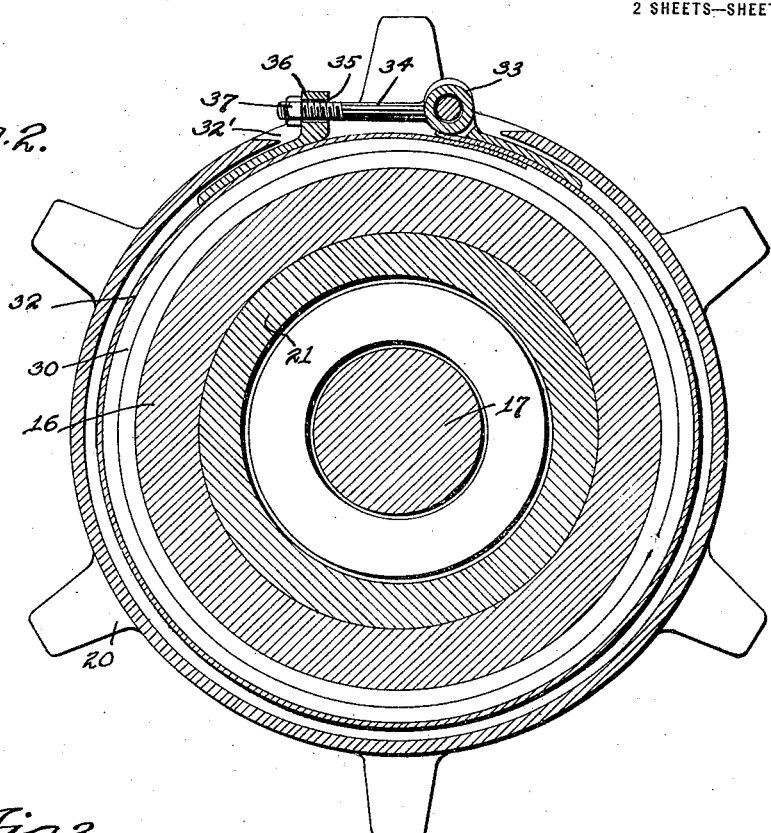
Figure 3:
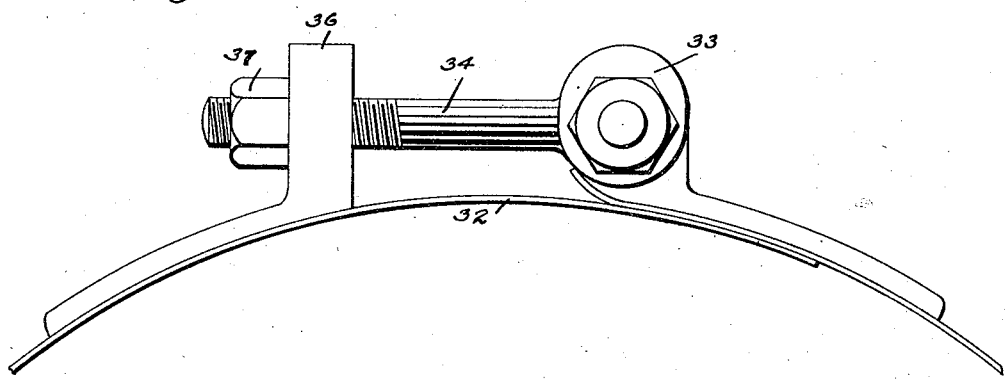

In the accompanying drawings;

Figure 1 is a vertical longitudinal sectional view taken through a transmission casing, and illustrating the application of the present invention thereto, Fig. 2 is a horizontal sectional view taken along the line 2—2 of Fig. 1, and Fig. 3 is an enlarged detail view of the structure for adjusting the tension upon the packing.

Referring more particularly to the accompanying drawing the packing A comprising the present invention is employed in this instance in connection with a transmission structure B, the type set forth in the above mentioned application. The structure B embraces a casing formed to comprise upper and lower hollow sections 5 and 6 respectively which may be securely united in any suitable manner. Entering the sections formed in the casing C of the structure B is a motor shaft 7 which terminates in a fixed pinion 8, the latter meshing with a gear 9 fixed to a vertically extending shaft 10 journaled within the casing C. In order to reduce the speed of the motor associated with the shaft 7 and to effect a better application of its power, the shaft 10 is provided with a cog 11 which meshes with an enlarged gear 12, the latter being carried upon a second vertical shaft 13 journaled for rotation within the casing C. Also rotatable with the shaft 13 is a reduced pinion 14 which is disposed to mesh with an enlarged gear 15. By this construction it will be apparent that the speed of the motor employed for rotating the shaft 7 will be considerably reduced when its power is delivered to the gear 15.

The gear 15 carries a fixed hub 16 which is concentrically rotated about a stud shaft 17, the latter being suitably journaled in connection with the interior of the casing C. The interior of the hub 16 is provided with vertical ribs 18 which are disposed to engage within notches formed in superimposed friction disks 19, and the shaft 17 is further provided with a sprocket 20 which carries an upwardly extending substantially tubular sleeve 21. This sleeve is also provided with vertically extending ribs 22 which engage within corresponding notches formed in disks 23 which are alternately arranged with respect to the disks 19. The upper end of the sleeve 21 is suitably threaded for the reception of binding nuts 24 which are arranged to frictionally engage with the disks so that relative friction may be placed upon the latter. Obviously, when the sprocket 20 is rotated under normal load conditions, the friction between the disks 19 and 23 will be sufficient to permit said sprocket to be positively driven by the aforesaid gearing, however, should the sprocket be overburdened the friction upon said disks may be so adjusted as to permit of relative slippage between said disks so that the sprocket will rotate independently of the gearing, thus avoiding undue strain upon or damage of parts. A roller bearing 25 surrounds the lower end of the shaft 17, and a bracket 26 extends from the under side of the casing C to a position concentric with the lower end of the shaft, said bracket being provided with a bracket 27 for the reception of the lower end of the shaft and with an annular flange 28, which latter being arranged to engage with the hub of the sprocket so as to guide and center the latter.

In practice the casing C is preferably filled with a fluid lubricant, and considerable difficulty has been encountered in preventing the lubricant from escaping from the casing by way of the joint existing between the outer periphery of the hub 16 and the adjacent portion of the casing. To prevent this leakage of oil, the present invention contemplates the provision of the improved packing A, which in its preferred form consists of an annulus 29 which is securely carried by the lower portion of the casing and is disposed in concentric relation with respect to the hub 16. Supported within the annulus 29 are a pair of packing rings 30 which are obliquely beveled as at 31 to overcome the effects of wear, said rings being disposed to tightly engage with the periphery of the hub 16. To insure this engagement, use is made of a tension band 32, which is disposed within the annulus 29 and frictionally engages with the outer circumferential portion of the rings 30. The annulus 29 is recessed as at 32 and situated within this recessed portion is a bracket 33, the latter being securely carried by one end of the band 32. Pivotally connected with the bracket 33 is a bolt 34, which is arranged to pass through an opening 35 formed in a second bracket 36, carried by the opposite end of the band 32. The threaded end of the bolt 34 is adapted to receive a nut 37, which when threaded upon the bolt will engage with the second bracket 36 so that the band 32 as a whole may be drawn tightly about the rings 30, whereby upon the final tightening of the nut 37, said rings 30 will be forced into firm frictional engagement with the hub 16 and with the adjacent portions of the annulus 29, so that the joint 38 between the hub 16 and the casing C will be effectively sealed, thereby arresting the escape of the oil contained within the casing. By beveling the rings 30, it will be appreciated that wear upon the same may be readily taken care of and that by occasionally tightening the nut 37 the rings 30 will be maintained in firm coöperation with said hub.

The structure described is of a relatively simple nature and may be effectively employed for the purpose of preventing the escape of a fluid through a joint existing between a moving part and a stationary part. By beveling the rings 30 and employing the tension band 32 the effects of wear are readily overcome and it will be obvious that when pressure is imparted to the rings the same will not only be forced to contract but at the same time will have an outwardly wedging action which will overcome looseness in substantially three directions, thus maintaining the packing in such position as to effectively prevent the loss of the lubricant.

What I claim is:

1. In mechanism of the class described, the combination with a lubricant containing casing having an opening formed therein, of a rotatable member protruding through said opening, means for sealing the joint existing between the walls of said opening and said member, comprising a pair of beveled packing rings, an annulus securely carried by said casing and in which said rings are positioned, and a tension band surrounding said rings and serving to contract the latter inwardly about said member and in substantially perpendicular directions.

2. In mechanism of the class described, the combination with a lubricant containing casing having an opening formed therein, of a rotatable member protruding through said opening, means for sealing the joint existing between the walls of said opening and said member, comprising an annulus carried by said casing and disposed in concentric relation with respect to said member, a pair of beveled packing rings situated within said annulus and disposed in concentric relation with respect to said member, a tension band surrounding said rings, and threaded means carried by the extremities of said band for placing the latter under tension and to thereby effect the contraction of said packing rings.

3. In mechanism of the class described, the combination with a casing having an opening formed therein, of a rotatable member projecting through said opening, means for sealing the joint existing between the wall of said opening and said member, comprising an annulus rigidly carried by said casing and disposed in concentric relation with respect to said member, said annulus having a recess formed in one of its walls, a pair of beveled packing rings disposed within said annulus and in engagement with said rotatable member, a tension band surrounding said packing rings for holding the latter in engagement with said member, brackets secured to different end portions of said band and positioned within said annulus recess, and threaded means carried by said brackets for effecting the contraction of said band.

4. In mechanism of the class described, the combination with a lubricant containing casing having an opening formed therein, of a rotatable member projecting through said opening, means for preventing the escape of the lubricant between the joint defined between said rotatable member and the wall of said opening, comprising an annulus rigidly carried by said casing at a position exterior of said opening and disposed in concentric relation with respect to said member, said annulus being provided with a recess in one of its walls, a plurality of beveled packing rings disposed within said annulus and in concentric engagement with said member, a tension band surrounding said rings for maintaining the engagement between the latter and said member, brackets carried upon opposite ends of said band and disposed to protrude through said recess, a bolt pivoted to one of said brackets and having its threaded end lying within an opening formed in the other of said brackets, and a threaded device adjustably carried by said bolt and coöperative with said brackets to draw the latter relatively whereby the tension exercised by said band will be regulated.

In testimony whereof I affix my signature.

WILLIAM E. MOODY.